United States Patent
Dillon

[11] Patent Number: 5,947,630
[45] Date of Patent: *Sep. 7, 1999

[54] SIDE AIR BAG MODULE ATTACHMENT

[75] Inventor: Michael R. Dillon, Holly, Mich.

[73] Assignee: Breed Automotive Technology, Inc., Lakeland, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/745,362

[22] Filed: Nov. 8, 1996

[51] Int. Cl.⁶ ........................................................ F16B 1/00
[52] U.S. Cl. ........................... 403/393; 403/282; 403/274; 411/509; 411/913; 280/728.2
[58] Field of Search ....................... 411/508, 509, 411/510, 913, 107; 403/274, 277, 278, 279, 280, 281, 282, 393; 280/728.2

[56] References Cited

U.S. PATENT DOCUMENTS 3,842,709  10/1974  Fuqua .
4,083,162   4/1978  Regan et al. ................... 411/508 X
4,512,699   4/1985  Jackson et al. ..................... 411/368
5,333,897   8/1994  Landis et al. ................... 280/728 A
5,556,125   9/1996  Ricks et al. .................... 411/509 X

FOREIGN PATENT DOCUMENTS 9402753  4/1994  Germany .

Primary Examiner—Anthony Knight
Assistant Examiner—William L. Miller
Attorney, Agent, or Firm—Markell Seitzman

[57] ABSTRACT

A system comprising: a fastener and a housing (70), the fastener including a rivet portion having a first head (304) and a shaft (302) extending therefrom, a spring cup (210) received upon the shaft having a top portion (211) adjacent the head (304) and a plurality of spring fingers (212) extending from the top (211) and a hollow collar (214) having a first portion (216) received within the spring cup (210) and a second portion (218) extending beyond the fingers (212), an end portion (308) of the shaft opposite the head (304) being malleable and formable into a rivet head (308') to mate with the housing.

1 Claim, 4 Drawing Sheets

SIDE AIR BAG MODULE ATTACHMENT

BACKGROUND AND SUMMARY OF THE INVENTION

The present invention generally relates to air bag modules and an improved snap fastener for attaching such modules.

It is an object of the present invention to provide an improved snap fastener that will facilitate the installation of devices such as air bag modules within automotive vehicles. A further object of the invention is to provide an improved method of assembling and attaching an air bag module to a frame of a vehicle seat or other support structure of a vehicle.

Accordingly the invention comprises: an improved fastener and a system comprising the fastener and a housing and method of securing the fastener to the housing. The fastener including a rivet portion having a head and a shaft extending therefrom, a spring cup received upon the shaft having a top portion adjacent the head and a plurality of spring fingers extending from the top and a hollow collar having a first portion received within the spring cup and a second portion extending beyond the fingers, an end portion of the shaft opposite the head being malleable and formable into a rivet head to enable securement to a body such as an air bag module part.

Many other objects and purposes of the invent will be clear from the following detailed description of the drawings.

DETAILED DESCRIPTION OF THE DRAWINGS

Figure 1:
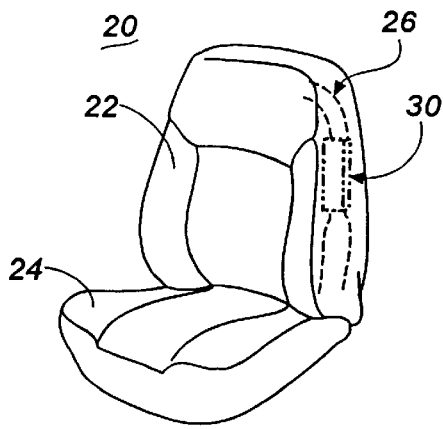
FIG. 1 illustrates the location of a side impact air bag module integrated with the back of a typical automotive seat.
Figure 2:
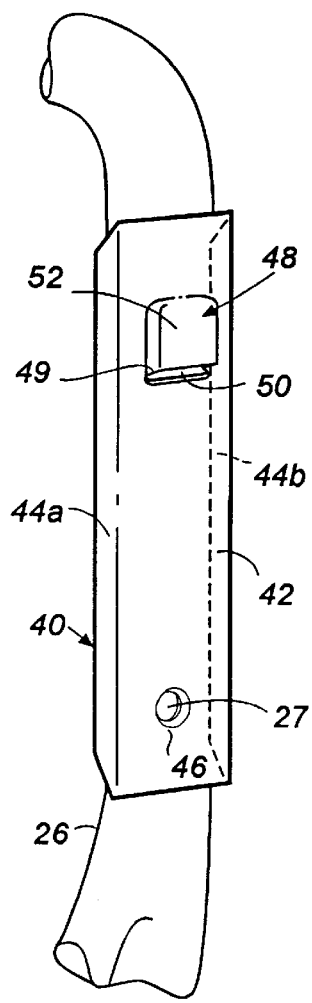
FIG. 2 is a partial sectional view of a portion of a seat frame with a bracket attached thereto.

FIG. 1 illustrates a vehicle seat 20 having an upholstered back 22 and cushion 24. As is known in the art, the seat includes a support structure or frame 26 within the back and the cushion. Frame 26 (also partially shown in FIG. 2) is typical of frames used within typical automotive seats which are often made from steel tubing having a circular, oval or generally rectangular cross-section. Diagrammatically shown attached to the frame 26 is an air bag module 30 shown in detail below. The module comprises an optional mounting bracket 40, housing 70, inflator 122, air bag 124 and cover 100. When activated, the air bag will deploy between the side of the occupant and the side of the vehicle. The mounting bracket 40 (or alternately if the bracket 40 is not used, the frame 26) includes a socket opening 46.

Figure 3:
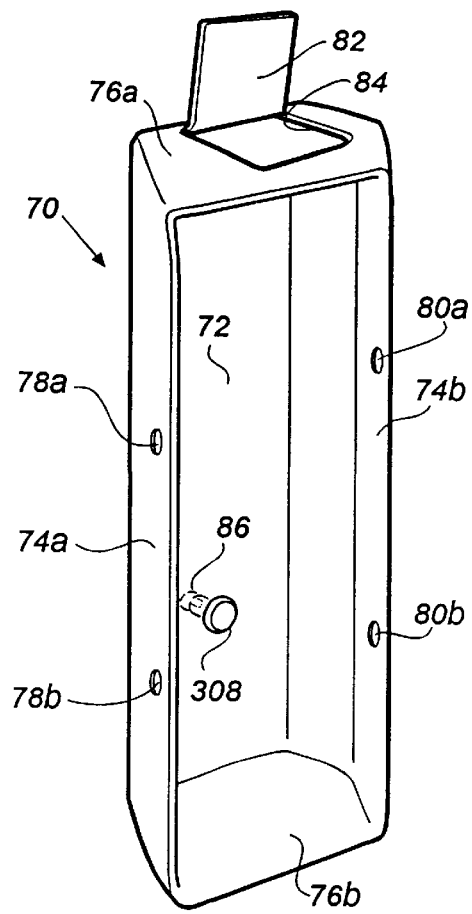
FIGS. 3 and 4 show various views of a housing.
Figures 4, 6:
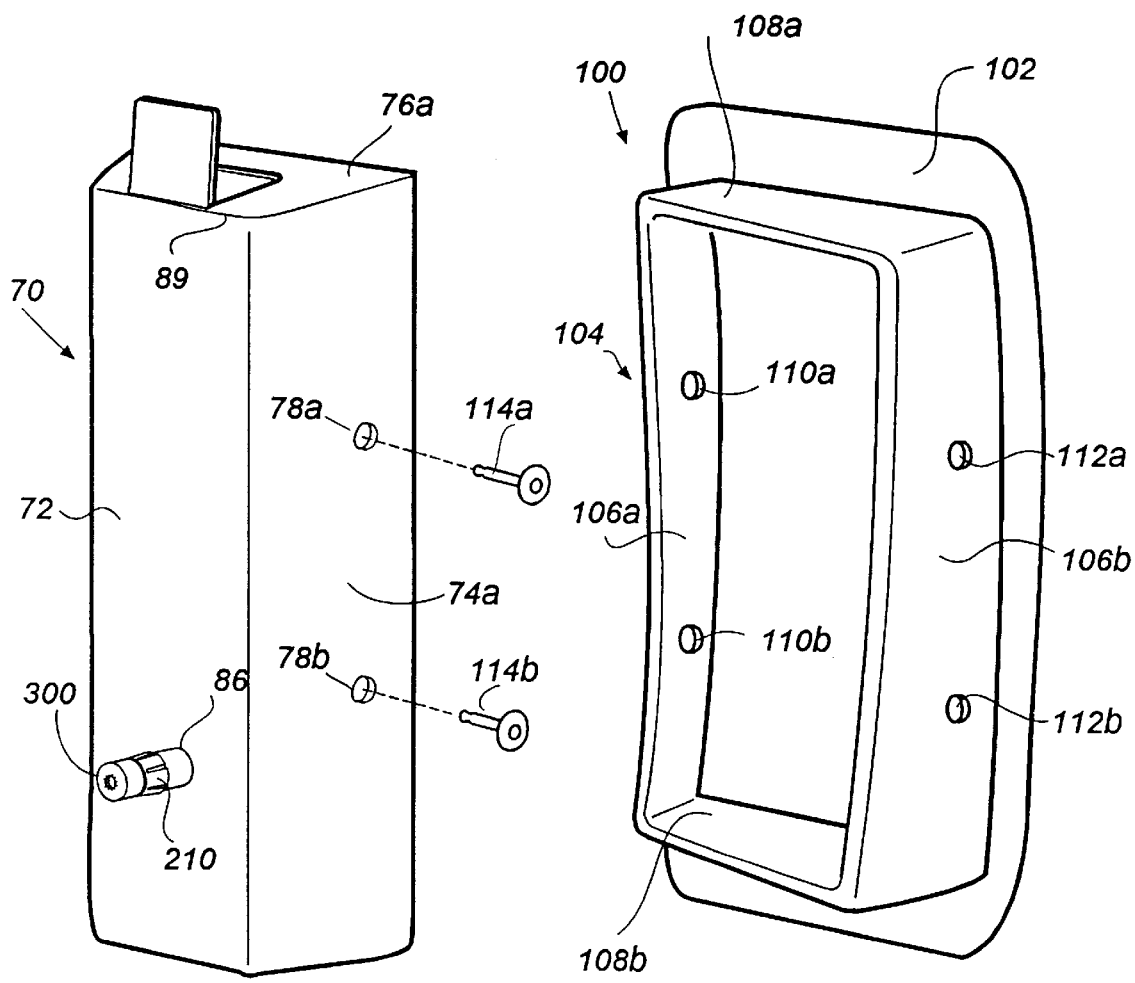

Reference is made to FIGS. 3 and 4 which illustrate front and rear projected views of a housing 70. The housing is preferably made of steel or aluminum and includes a bottom 72 with opposing sides 74a and 74b extending therefrom and opposing ends 76a and 76b. Side 74a includes openings 78a and 78b while side 74b includes openings 80a and 80b. End 76a includes a spring tab or hook 82 formed from a bent-over portion of end 76a which is severed about an opening or slit 84. It will be apparent from the description below that the spring tab, rather than being formed as an integral portion of the end 76a, can be provided by a separate attachment member secured thereto. The housing 70 further includes an opening 86 in its bottom through which a fastener 300 such as a known snap fastener can be inserted.

Figure 8:
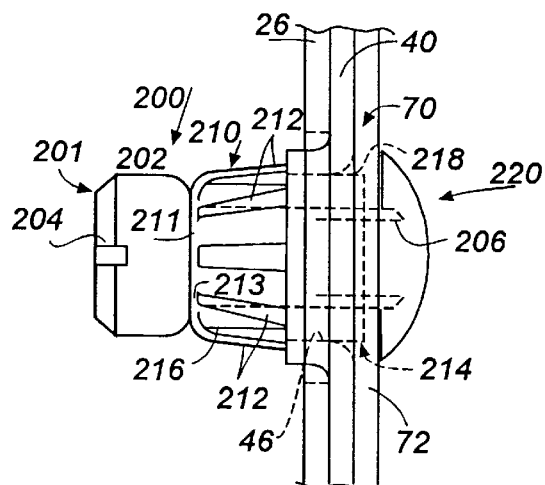
FIG. 8 illustrates a prior art snap fastener.

Reference is briefly made to FIG. 8 which illustrates a module housing 70 secured to a bracket 40 and frame 26 using a prior art fastener 200. This fastener includes a bolt 201 having a head 202, having a slot 204 for receiving a screw driver and a threaded shaft 206. Received upon the shaft 206 is a spring cup 210 having a top 211, with an opening 213 therein and a plurality of fingers 212 extending from the top. The fingers face away from the head 202. A hollow collar 214 is received within the spring cup and includes a tapered portion 216 received within the spring cup 210 and an end portion 218 extending outwardly from the spring cup 210. A nut 220 is received upon the threaded shaft 206 to secure the fastener to the housing 70. The nut 220 is first secured to a body such as the bottom 72 of the module housing 70 such as by welding (the welds are shown by numeral 222) and the bolt, spring cup and collar attached to the nut. Thereafter the housing (with the fastener 200 secured thereto) can be secured to another structure such as a frame 26 or a bracket 40. This arrangement permits the spring fingers to be inserted and secured within the socket opening 46 (formed on the bracket 40 or formed directly in the seat frame 26). Once seated within this socket opening the fingers spring outwardly preventing withdrawal of the fastener.

Figure 9:
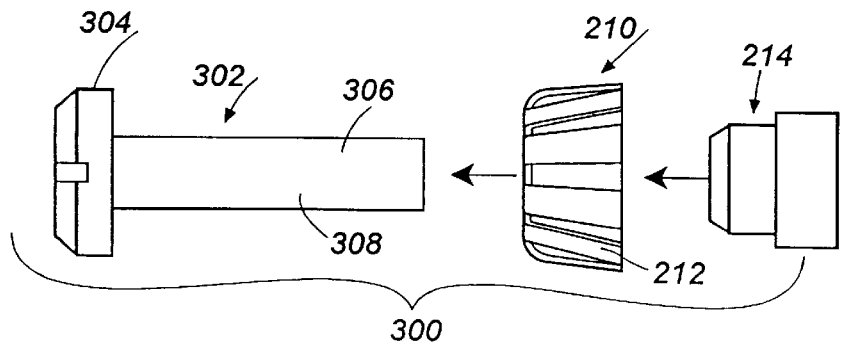
FIG. 9 shows a snap fastener constructed in accordance with the present invention.
Figure 11:
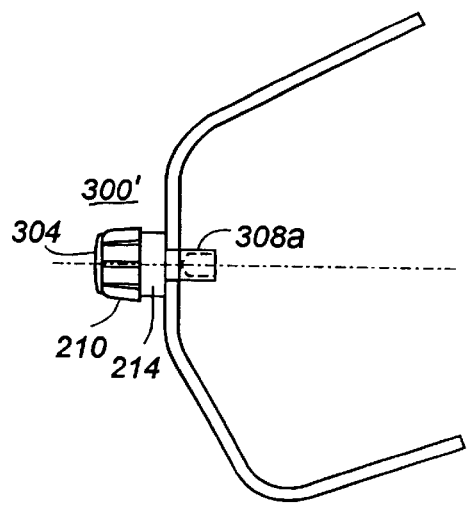
FIG. 11 shows an alternate fastener.
Figure 10:
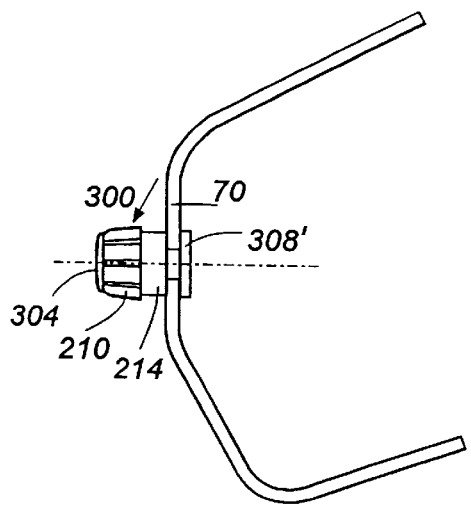
FIG. 10 shows a partial view of a housing with the fastener of FIG. 9 attached thereto.

FIG. 9 illustrates a new snap fastener made in accordance with the present invention. The fastener 300 includes a rivet 302, made for example from a malleable steel, having a head 304 and a shaft 306, a spring cup 210, having fingers 212 and a collar 214. During assembly of the fastener the spring cup 210 is inserted upon the shaft 206 and the collar 214 inserted within the spring cup 210 and press fit upon the shaft 306 such that an end 308 of the shaft 302 extends outwardly therefrom. When in use, as shown in FIG. 10, the fastener end 308 is inserted with a mounting opening or hole 86 of a body such as housing 70. Thereafter, with the head 304 supported within a fixture of known construction, the end 308 of the fastener is deformed, forming a rivet head, clamping the housing 70 between the deformed end 308' of the shaft 302 and collar 214. This configuration is shown in FIG. 10. FIG. 11 shows an alternate fastener 300' having a shaft 302 with a hollow end 308a. As can be appreciated FIG. 11 illustrates the fastener 300' prior to having its end 308' deformed to clamp the housing 70 thereto. End 308a is similarly deformed forming a rivet head.

Figure 5:
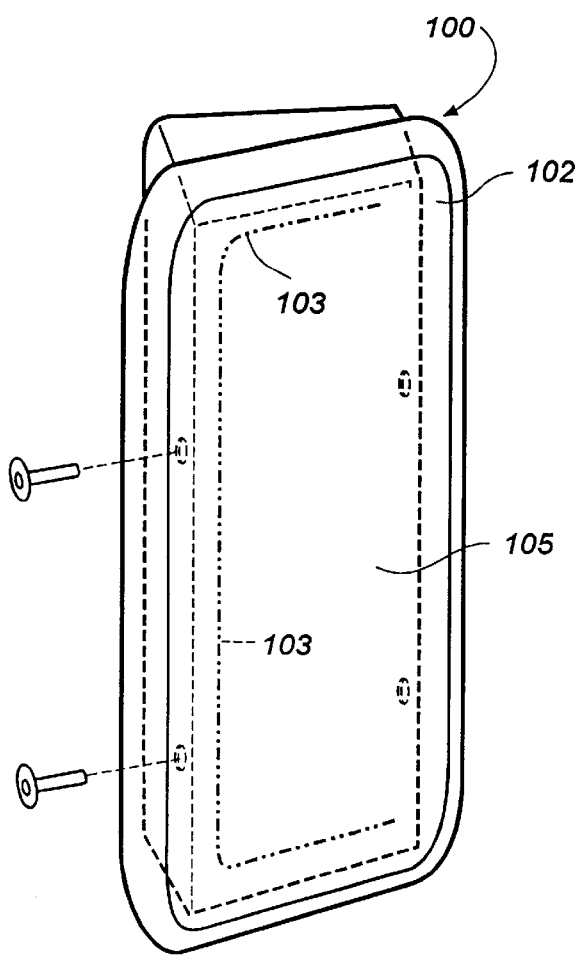
FIGS. 5 and 6 show views of a cover.

Reference is made to FIGS. 5 and 6 which show front and rear views of a cover generally shown as 100. The cover 100 is preferably made of an elastic material. The cover includes a top or lid 102 which also has formed thereon a tear seam 103. That portion 105 of the lid 102 generally opposite 103a acts as a hinge to permit the cover material within the tear seam area to pivot after the tear seam is opened in response to the expanding air bag. Extending from the underside of the cover is an open, box-like member 104 having sides 106a, 106b and ends 108a and 108b. Side 106a includes openings 110a and 110b while side 106b includes openings 112*a* and 112*b*. The inner dimensions between the opposing sides 106*a,b* and the opposing ends 108*a,b* are sized to permit the member 104 to be slipped over the sides and ends of the housing 70. When the cover is in place, a plurality of fasteners 114*a,b*, such as rivets, are received through openings 112*a,b* of the cover 110 and through openings 78*a,b* to fasten one side of the cover in place.

Figure 7:
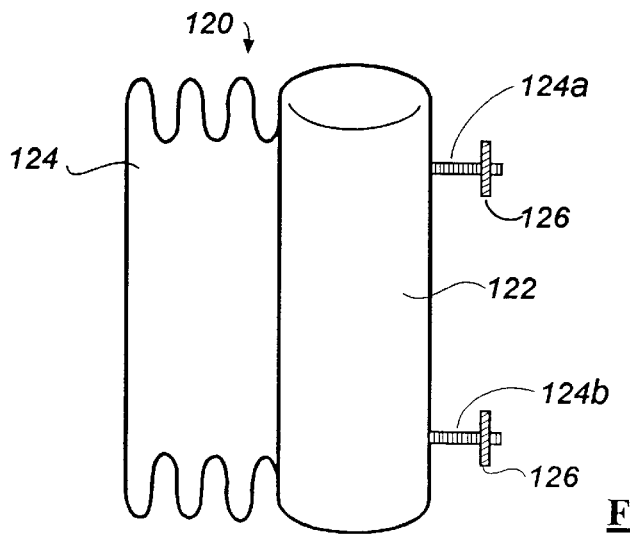
FIG. 7 diagrammatically illustrates an inflator/air bag assembly.

Prior to attaching the cover 100 to the housing 70, an inflator/air bag assembly generally shown as 120 (see FIG. 7) is attached to the housing 70. The assembly 120 may include a cylindrically shaped inflator generally shown as 122 with an air bag 124 positioned about the inflator to receive inflation gas which is generated in response to an activation signal. A plurality of fasteners such as threaded bolts 124*a* and 124*b* are inserted through openings 80*a* and 80*b* of the housing. Thereafter the cover 100 is positioned adjacent the housing 70 such that the extending ends of the fasteners 124*a* and 124*b* extend through the openings 110*a* and 110*b* of the cover. The inflator assembly 120, housing 70 and cover 100 may be secured together by hex nuts such as 126 which are shown attached to the threaded fasteners 124*a,b* (in FIG. 7).

Figure 12:
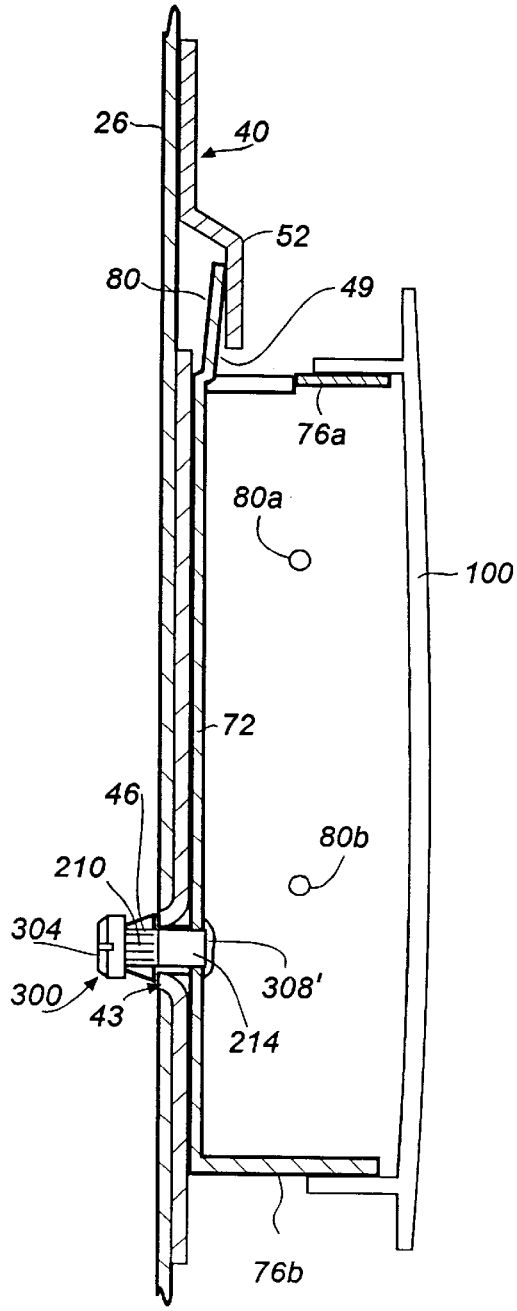
FIG. 12 is a side view of an assembled, fastened module.

Reference is again made to FIG. 2 The bracket 40, positioned on the frame 26, includes a front surface 42 and sides 44*a* and 44*b* extending therefrom. Portions 43 (see FIGS. 8 or 12) of the front surface extend rearwardly forming a retaining ring and socket opening 46 to receive the ends of the spring fingers 212 of the snap fastener 300. The bracket 40 is secured to the frame such as by welding with the opening 86 in alignment with an opening 27 within the frame. The bracket 40 is also preferably aligned on the seat frame to provide an optimum deployment angle for occupant protection based on static and dynamic testing such as generally parallel or perpendicular to the seat frame. In the embodiment shown the bracket 40 is generally perpendicular to the seat frame. It should be apparent that while the preferred embodiment of the invention illustrates the module 30 positioned to a seat frame 26, the B-pillar, interior door frame or other support member within the vehicle could be used in conjunction with the present invention. The bracket 40 additionally includes an open-faced receptacle, slit or retaining opening generally shown as 48 formed by slitting the front surface at 50 and forming an outwardly extending projection 52. Alternatively, this receptacle could be attached as a separate piece to the bracket. The open face of the receptacle 48 is shown as 49. The module 30 is assembled as follows. The snap fit connector 88 is inserted into the bottom 72 of the housing. Thereafter, the inflator/air bag assembly 120 is fitted to the side 74*b* and the cover 100 attached to the housing. The housing is positioned upon the bracket 40 with the spring tab 80 inserted within the receptacle 48. The inner dimensions of the receptacle 48 and the width of the hook 80 are chosen to prevent the housing 70 from moving laterally. This is achieved by a friction fit between the receptacle 48 and the tab or hook 80. With the hook or tab 80 within the socket, the housing 70 is rotated about its rear corner 89 permitting the bottom 72 to lay flat against surface 42. As the bottom 72 is brought into contact with surface 42, the snap fit connector enters the aligned openings 46 and 27 and snaps therein securing the housing 70 to the bracket 40 as shown in FIG. 12. As can be appreciated, the rotation of the housing about corner 89 further bends the spring hook 80 providing an additional resilient force between the receptacle 48 and the hook to maintain the upper portion of the housing 70 in place.

It should be appreciated from the above that the bracket 40 is optional in that the open-faced receptacle 48 can be formed directly on the frame 26 which may be formed by providing a rectangular slit within a rectangular, hollow tubular frame 26 and depressing a portion of the frame just below the slit. Further the tab 82 can be removed and replaced with another snap fastener received through the housing bottom.

Many changes and modifications in the above described embodiment of the invention can, of course, be carried out without departing from the scope thereof. Accordingly, that scope is intended to be limited only by the scope of the appended claims.

I claim:

1. A system comprising:

a housing including a thin wall having a first side on an outside of the housing, an opposite second side within the housing and an a fastener opening therein;

a fastener (300;300') secured to the housing prior to attachment to a mating structure, the fastener including a rivet portion having a head (304) and a shaft (302) extending therefrom, an end portion of the shaft extending through the fastener opening to the second side of the housing, a spring cup (210) located adjacent the first side of the housing, received upon the shaft having a top portion (211) adjacent the head (304) and a plurality of spring fingers (212) extending from the top portion (211) and a hollow collar (214) having a first portion (216) received within the spring cup (210) and a second portion (218) extending beyond the fingers (212), the end portion (308) of the shaft opposite the head (304) being malleable and formable into a rivet head (308') for securement to secure the fastener to the housing wherein the housing includes a top having a resilient spring arm and wherein the system includes the mating structure, the mating structure including first means for receiving and holding the resilient arm in place thereon and a second fastener opening to receive the spring fingers in locking engagement therewith.

* * * * *